May 13, 1952 — A. Y. DODGE — 2,596,380
BRAKE WEAR TAKE-UP
Filed July 21, 1947

Inventor:
Adiel Y. Dodge,
By Dawson, Booth and Spangenberg,
Attorneys.

May 13, 1952      A. Y. DODGE      2,596,380
BRAKE WEAR TAKE-UP
Filed July 21, 1947      2 SHEETS—SHEET 2
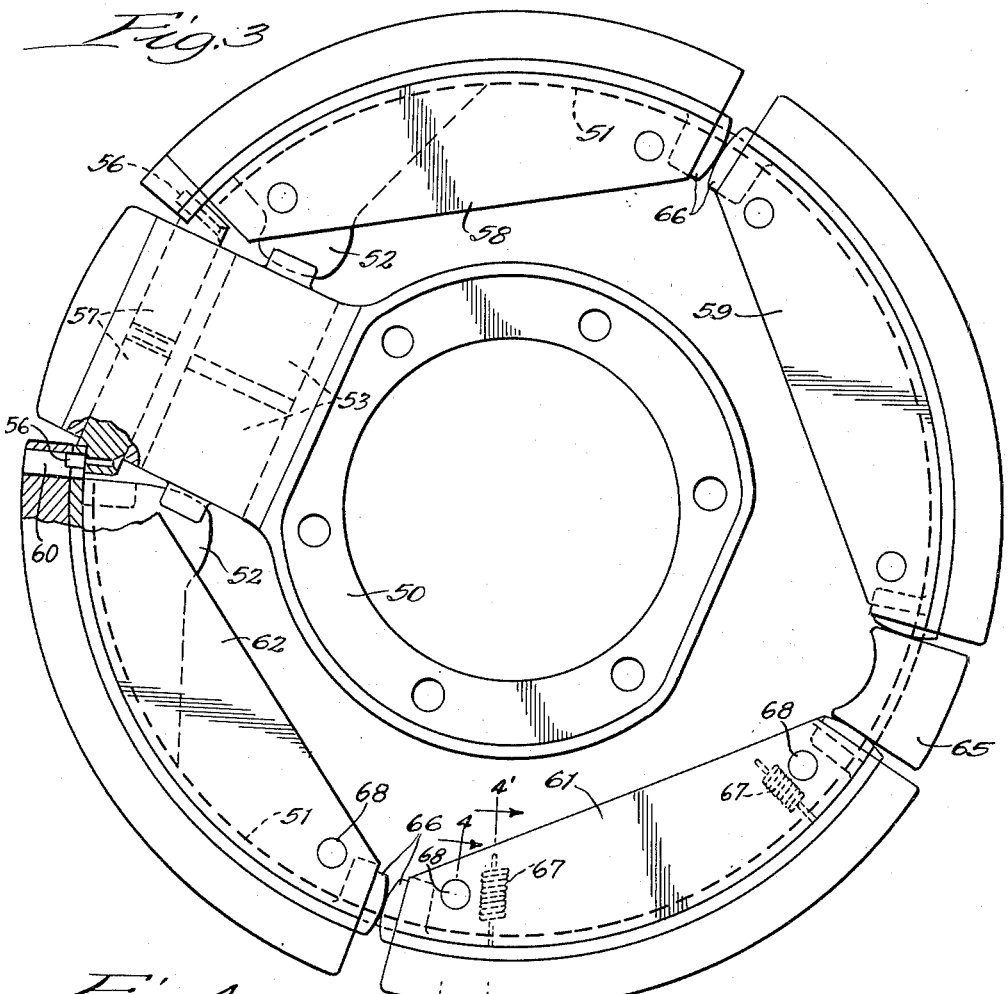
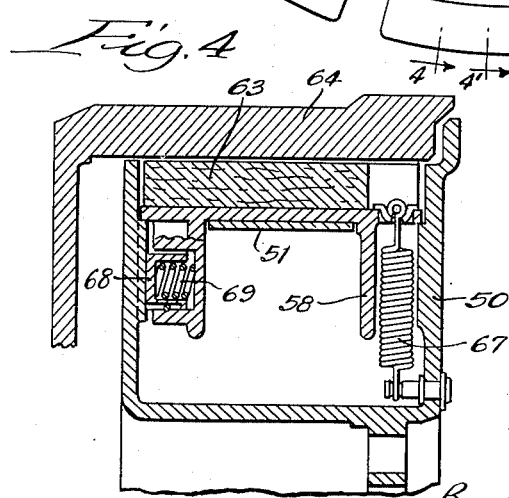
Inventor:
Adiel Y. Dodge,
By Dawson, Booth and Spangenberg,
Attorneys.

Patented May 13, 1952

2,596,380

UNITED STATES PATENT OFFICE 2,596,380

BRAKE WEAR TAKE-UP

Adiel Y. Dodge, Rockford, Ill.

Application July 21, 1947, Serial No. 762,507

3 Claims. (Cl. 188—79.5)

This invention relates to brakes and more particularly to friction wheel brakes of the type adapted to be used on automotive vehicles.

It is one of the objects of the invention to provide a brake in which the friction segments or shoes are automatically adjusted to maintain constant brake clearance.

Another object is to provide a brake in which the tangential clearance between the segments and the abutments is automatically maintained constant. This feature eliminates excessive circumferential movement of the segments thereby to maintain the brake clearance constant and to eliminate or minimize clicking when the brake is applied.

Still another object is to provide a brake which is simple to construct and assemble. In one desirable embodiment, rigid channel-shaped segments are employed which are operated by a flexible band lying within the channels of the segments.

The above and other objects and advantages of the invention will be more readily apparent from the following description when read in connection with the accompanying drawing, in which:

Figure 3 is a view similar to Fig. 1 of an alternative construction; and

Figure 4 is a partial broken radial section of the brake of Fig. 3, partially on the line 4—4 and partially on the line 4'—4' of Figure 3.

Figure 1:
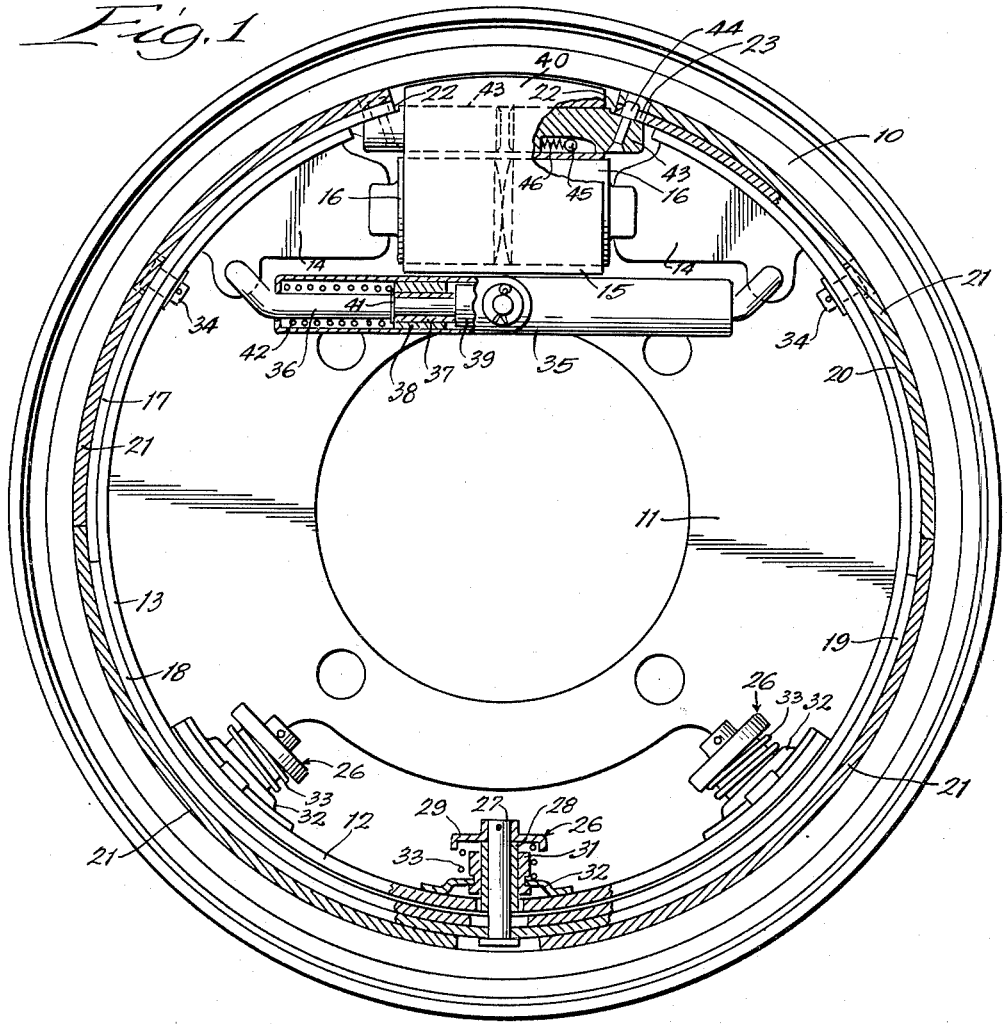
Figure 1 is a transverse view with parts in section illustrating a brake embodying the invention.
Figure 2:
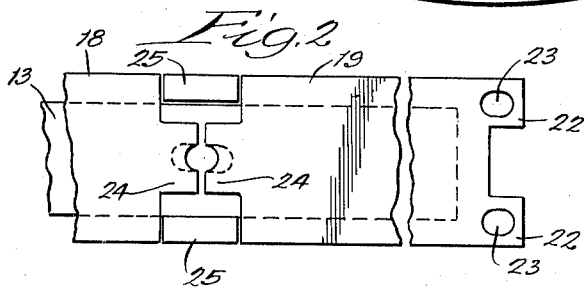
Figure 2 is a partial view illustrating the inter-fit of the brake segment ends at the bottom abutment, as seen in Fig. 1.
Figure 2A:
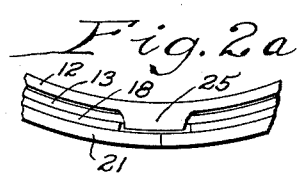
Figure 2a is a partial side elevation showing the fixed abutments

The brake, as illustrated in Figs. 1 and 2, is adapted to be used with the usual cylindrical brake drum as shown at 10 which may form a part of or be attached to a vehicle wheel. The brake structure is adapted to fit within the cylindrical drum 10 and comprises a support or backing plate 11 adapted to close the inner side of the drum and to be fixedly mounted on the vehicle. At one side, shown as the bottom in Fig. 1, the support is formed with an arcuate flange 12 lying within and concentric with the drum and extending partially around a circle.

The brake is adapted to be operated by a flexible band 13 which overlies the flange 12 and whose ends are separated and are formed with inwardly extending flanges 14. The band is adapted to have its ends separated so that it will be spread radially by an actuating means shown as a cylinder 15 in which a pair of pistons 16 fit to be forced outward by the introduction of fluid under pressure into the center part of the cylinder. The pistons are connected respectively to the flanges 14 so that when fluid is supplied to the cylinder the ends of the band will be separated and the band will expand radially.

A plurality of friction segments 17, 18, 19, and 20 overlie the band 13 to be spread thereby into frictional engagement with the drum. As shown, each of the segments is of identical construction including a metal backing strip over which a lining 21 is secured. One end of each strip terminates in a pair of outwardly projecting ears 22 which are formed with circumferentially elongated openings 23. At its opposite end, each segment is formed with a central projection 24 which is of a size to fit between the ears 22. In assembling the segments, the segments 17 and 20 are arranged with the ears 22 at the upper ends thereof and the projections 24 at the lower ends thereof. The segments 18 and 19 are similarly placed so that the ears at the upper ends thereof will inter-fit with the projections at the lower ends of the segments 17 and 20. The projections 24 at the lower ends of the segments 18 and 19 fit between abutments 25 which are fixedly mounted at the lower end of the backing plate or support. With this construction, the segments 18 and 19 are free to move away from the abutments 25. The ends of the segments adjacent the sides thereof are in registry with the abutments 25 and will engage the abutments to limit clockwise movement of the segment 19 or counterclockwise movement of the segment 18 as will be apparent from Figure 2.

To hold the operating band and the segments in place on the backing plate, fastening means are provided which may serve both as return spring devices and as automatic radial adjusters. As shown, in Fig. 1, one such device 26 is provided adjacent each end of the flange 12 and a similar device is provided at the center of the flange 12 to engage the adjacent ends of the segments 18 and 19. The devices 26 may be constructed as more particularly described in my copending application Serial No. 693,642 filed August 29, 1946. As shown, each of the devices 26 comprises a pin 27 extending loosely through an opening in the flange 12 and through a similar enlarged opening in the operating band 13 to provide for circumferential movement of the band. The pin has a head at its outer end which is adapted to engage the backing strips of the segments and, in the case of the center device, will partially overlie the adjacent portions of the projections 24 on the segments 18 and 19. A friction sleeve 28 is mounted around the pin 27 and may be held thereon by a cap 29 which is fixedly secured to the pin. The sleeve 28 frictionally engages a sleeve 31 which is formed with a peripheral groove. A retaining plate 32 which may be an integral part of the flange 12 fits in the groove and is thinner than the groove so that free radial movement of the sleeve 31 relative to the plate 32 is permitted in an amount equal to the normal radial movement of the segments during a brake application. A return spring 33 engages the cap 29 and the plate 32. The spring 33 normally pulls the pin and the operating band and segments radially inward so that the segments will clear the drum with the normal desired amount of brake clearance. When the brake is applied, the free motion between the sleeve 31 and plate 32 is normally sufficient to permit a brake application. However, as the lining wears so that the segments move outward to a greater radial extent, the sleeve 28 and the pin will slide through the sleeve 31. When the brake is released, the spring will return the operating band and segments the normal distance radially inward but is not sufficiently strong to slide the pin and sleeve 28 through the sleeve 31. Thus the normal radial clearance between the segments and the drum is automatically maintained at all times regardless of lining wear.

To maintain the clearance constant at the upper end of the device, the segments and operating band are tied together radially by pins 34 which may fit loosely through openings in the band to permit limited circumferential movement between the band and the segments. A return device is provided to urge the flanges 14 together thereby to move the segments radially inward from the drum, and, as shown, the device comprises an outer cylinder 35 attached to the right-hand flange 14. A rod 36 is attached to the left-hand flange 14 and extends into the cylinder 35 where it carries a sleeve 37 rigidly pressed thereon. The sleeve 37 frictionally fits loosely within a sleeve 38 which has a relatively tight frictional fit within the cylinder 35. The rod 36 has an enlarged end 39 at its inner end which may engage the sleeve 38 and may have a shoulder or flange as shown at 41 to engage the opposite end of the sleeve 38 so as to provide for limited free movement between the rod and the sleeve 38.

During normal brake application, the rod 36 moves out of the cylinder 35 just sufficient to bring the enlarged head 39 into engagement with the inner end of the sleeve 38. Upon excessive movement of the brake segments, due, for example, to lining wear, the enlarged head 39 will engage the sleeve 38 and slide it to a new position in the cylinder 35. A return spring 42 acts on the rod 36 to urge it into the cylinder but has insufficient strength to overcome the friction between the sleeve 38 and the cylinder. Thus, the brake is automatically reset to maintain constant clearance between the upper ends of the segments and the brake drum.

According to the present invention, automatic adjustment abutments are provided automatically to adjust the circumferential clearance for the segments. As shown, the automatic adjustment abutments are provided at the upper end of the brake adjacent the cylinder 15 and comprise plungers 43 which are slidable tangentially in bores in a fixed housing part 40. Each of the plungers carries a pin 44 which fits loosely in the openings 23 in the ends of the brake segments so that the segments have a limited circumferential movement relative to the abutments. The plungers 43 are permitted to move tangentially apart but are held against movement together by ratchet means shown as including a ball 45 fitting within a tapered slot in the plunger and urged to the small end of the slot by a spring 46. It will be understood that any desired type of one-way holding means or ratchet may be utilized, the construction shown being only as an example of the type of device which is suitable.

In operation, the clearance between the pins 44 and the openings 23 is normally sufficient to permit the segments to move into engagement with the drum. When excessive movement of the segments is produced, as, for example, due to lining wear, the outer ends of the openings 23 will engage the pins 44, as shown in Fig. 1, and slide the plungers outward. The ratchet device will lock the plungers in their new position so that the abutments are automatically adjusted to maintain the tangential clearance between the abutments and segments constant. This not only assists in maintaining the radial clearance between the segments and drum constant, but also limits the maximum circumferential movement of the segments to limit or minimize clicking.

It will be noted that when the drum is turning clockwise, as seen in Fig. 1, the segments 17 and 18 are held against circumferential movement by engagement of the upper end of segment 17 with a shoulder on the abutment plunger 43 while the segments 19 and 20 abut against the fixed abutments 25. At this time, therefore, only the right-hand plunger 43 can be adjusted to maintain the circumferential clearance constant. However, the left-hand plunger 43 will be similarly adjusted when the drum is turning in the opposite direction so that both abutments will be maintained in proper adjustment at all times.

Figs. 3 and 4 illustrate an alternative construction employing rigid shoes or segments in place of the flexible shoes or segments of Figs. 1 and 2. The construction, as shown, comprises a backing plate or support 50 which carries a flexible operating band 51. The ends of the operating band, as shown, are formed with flanges 52 engaging operating pistons 53 similar to the pistons 16 of Fig. 1. Adjacent the pistons, the support carries abutment plungers 57 similar to the plungers 43 of Fig. 1 and which carry abutment pins 56. The plungers 57 may be provided with ratchet means similar to the ratchet means shown in Fig. 1 which will prevent them from moving tangentially together while permitting them to move tangentially apart.

Four segments are provided, as shown, at 58, 59, 61, and 62 which may be identical in construction and each of which comprises a channel-shaped body formed with inwardly extending edge flanges to provide a rigid segment or shoe construction. Each segment carries a friction lining 63 adapted to engage a cylindrical brake drum 64. The segments 59 and 61 abut against a fixed abutment 65 at one end and against the adjacent segments 58 and 62 at their opposite ends, as shown. The segments 58 and 62 are formed adjacent the abutment plungers 57 with enlarged openings 60 centrally of their width and greater tangential length than the pins 56 into which the pins 56 extend. The segments are formed at their ends adjacent their sides only with abutment plates 66 which engage the abutment 65, which engage each other at the adjacent ends of the segments, and which may engage the plungers 57. The abutment plates 66 are preferably spaced laterally of the segments so that the operating band 51 can pass between them and lie within the segment channels, as seen in Fig. 4. At the ends of the segments adjacent the plungers 57 the plates 66 are spaced back from the ends of the central parts of the segments so that they will not engage the plungers 57 until substantially all of the clearance between pins 56 and openings 60 has been taken up. This clearance is sufficient to accommodate normal braking movements but on excessive movements due to lining wear the plungers 57 will be slid outward to a new position of adjustment. Thus this construction operates in the same manner as the corresponding construction of Figures 1 and 2 to assist in maintaining constant radial clearance and to limit circumferential movement of the segments.

The segments may be urged inward by return springs 67 connected to each of the segments adjacent the corners thereof and may have automatic radial adjustment devices of the type more particularly described and claimed in my copending application Serial No. 725,369 filed January 30, 1947. As shown, such devices comprise cup-shaped friction members 68 fitting loosely within sockets within the brake segments to provide for limited radial movement and urged against the sides of the support or backing plate by springs 69. During normal brake applications, the segments move relative to the cup-shaped members 68 to engage the drum without moving the members 68. However, when excessive radial movement is required, due to lining wear, the members 68 will be moved to the new position in which they will be held by frictional engagement with the support. Thus, normal radial clearance is maintained at all times between the segments and drum by the friction devices 68 and by the automatically adjustable abutments 57. At the same time, the abutments 57 maintain constant circumferential clearance in the manner explained above in connection with Figs. 1 and 2.

While two embodiments of the invention have been shown and described in detail, it will be understood that they are illustrative only and are not intended to be a definition of the scope of the invention, reference being had for this purpose to the appended claims.

What is claimed is:

1. A brake comprising a support, a flexible operating band carried by the support, actuating means carried by the support and engaging the ends of the operating band to expand it radially, a plurality of brake segments overlying the operating band and slidable thereon to be spread radially thereby, tangentially movable abutments, means forming lost motion connections between the abutments respectively and the adjacent segment ends whereby the segments will move the abutments away from each other upon a predetermined movement of the segments, and means carried by the support and engaging the abutments to prevent the abutments from moving toward each other.

2. A brake comprising a support, radially expansible operating means carried by the support, a plurality of brake segments overlying the operating means and circumferentially movable relative thereto to be spread radially thereby, and a plurality of abutments carried by the support and engageable with the segments to limit circumferential movement thereof, at least one of the abutments including a tangentially movable part, means forming a lost motion connection between said part and the adjacent segment whereby the segment will move the part in one direction upon a predetermined movement of the segment, and means carried by the support and engaging said part to prevent tangential movement of said part in the other direction only.

3. A brake comprising a support, spaced abutments on the support, brake segments arranged in pairs in end to end relation between adjacent abutments, operating means radially within the segments and engaging the segments for free tangential movement to expand the segments radially, at least one of the abutments including a pair of tangentially movable parts, means forming lost motion connections between the parts respectively and the ends of adjacent segments whereby the segments will move the parts away from each other upon a predetermined movement of the segments, and means carried by the support and engaging said parts to prevent the parts from moving toward each other.

ADIEL Y. DODGE.

REFERENCES CITED

The following references are of record in the file of this patent:

UNITED STATES PATENTS

| Number | Name | Date |
| --- | --- | --- |
| 1,934,235 | Rockwell | Nov. 7, 1933 |
| 1,937,691 | Girling | Dec. 5, 1933 |
| 1,991,525 | Thomas | Feb. 19, 1935 |
| 2,057,749 | Tatter | Oct. 20, 1936 |
| 2,074,710 | Tatter | Mar. 23, 1937 |
| 2,206,742 | Dodge | July 2, 1940 |
| 2,350,878 | Cowell | June 6, 1944 |
| 2,376,889 | Zipper | May 29, 1945 |
| 2,508,105 | Dodge | May 16, 1950 |
| 2,571,847 | Dodge | Oct. 16, 1951 |